(12) United States Patent
Khandelwal

(10) Patent No.: US 10,589,748 B2
(45) Date of Patent: Mar. 17, 2020

(54) METHOD AND SYSTEM TO DETERMINE DRIVER AVAILABILITY IN A RELAY SYSTEM

(71) Applicant: Rivigo Services Private Limited, Gurugram (IN)

(72) Inventor: Hemant Khandelwal, Bangalore (IN)

(73) Assignee: Rivigo Services Private Limited, Gurugram (IN)

( * ) Notice: Subject to any disclaimer, the term of this patent is extended or adjusted under 35 U.S.C. 154(b) by 0 days.

(21) Appl. No.: 15/683,622

(22) Filed: Aug. 22, 2017

(65) Prior Publication Data
US 2018/0086348 A1 Mar. 29, 2018

(30) Foreign Application Priority Data
Sep. 23, 2016 (IN) .............................. 201611032600

(51) Int. Cl.
| | |
|---|---|
| *B60W 40/09* | (2012.01) |
| *G08G 1/056* | (2006.01) |
| *G06Q 10/02* | (2012.01) |
| *G06K 9/00* | (2006.01) |
| *H04W 4/02* | (2018.01) |
| *G08G 1/00* | (2006.01) |

(52) U.S. Cl.
CPC ......... *B60W 40/09* (2013.01); *G06K 9/00832* (2013.01); *G06Q 10/02* (2013.01); *G08G 1/056* (2013.01); *G08G 1/202* (2013.01); *H04W 4/023* (2013.01)

(58) Field of Classification Search
CPC .... G06K 9/00832; G06Q 10/02; G08G 1/056; G08G 1/202; H04W 4/023
USPC ........................................................ 701/400
See application file for complete search history.

(56) References Cited

U.S. PATENT DOCUMENTS

2009/0030770 A1* 1/2009 Hersh .............. G06Q 10/06311
705/7.13

* cited by examiner

*Primary Examiner* — Maceeh Anwari
(74) *Attorney, Agent, or Firm* — Kolisch Hartwell, P.C.

(57) ABSTRACT

The present disclosure provides a computer-implemented method and system for determining availability of one or more drivers at one or more pit stops for driving one or more vehicles. The computer-implemented method includes reception of a first set of data associated with a plurality of drivers. Further, the computer-implemented method includes collection of a second set of data associated with vehicle of the one or more vehicles. Furthermore, the computer-implemented method includes gathering of a third set of data associated with a trip plan of one or more trip plans. Moreover, the computer-implemented method includes analyzing of the first set of data, the second set of data and the third set of data. Also, the computer-implemented method includes searching the availability of at least one driver of the plurality of drivers. The computer implemented method includes allocation of the available driver of the plurality of drivers to drive the vehicle.

16 Claims, 5 Drawing Sheets

METHOD AND SYSTEM TO DETERMINE DRIVER AVAILABILITY IN A RELAY SYSTEM

TECHNICAL FIELD

The present disclosure relates to a field of logistic system. More specifically, the present disclosure relates to a method and system for determining the availability of driver at one or more pit stop to drive one or more vehicles.

BACKGROUND

Logistics organizations have a responsibility of transporting goods and packages from numerous customers. The goods and packages are transported from one point to another within a city or a country. The logistics organizations rely on a fleet of vehicles and drivers for transporting the goods and packages. These vehicles include trailers, trucks, tractors, vans and the like. These vehicles pick up packages from customers and make a halt at number of intermediate locations before proceeding towards the destination. Typically, these vehicles are driven by a single driver for the whole route. The logistics organizations need to deliver the good and packages of each customer to the receiver in a fixed amount of time. Each package has a delivery schedule that should be followed strictly in order to avoid revenue loss for the logistics organizations. However, the vehicle driven by a single driver for a long route takes a toll on the drivers. So, the drivers need to make multiple stops in order to rejuvenate and continue the trip till the unloading point. This leads to a delayed delivery of the goods and packages to the customers. There is a consistent need to reduce time lost in transit in long distance transportation.

SUMMARY

In a first example, a computer-implemented method is provided. The computer-implemented method for determining availability of one or more drivers at one or more pit stops for driving one or more vehicles. The one or more vehicles include one or more sensors. The computer-implemented method may include a first step of receiving a first set of data associated with a plurality of drivers. In addition, the computer-implemented method may include a second step of collecting a second set of data associated with vehicle of one or more vehicles travelling from one point to another. Moreover, the computer-implemented method may include a third step of gathering a third set of statistical data associated with a trip plan of one or more trip plans associated with each vehicle of the one or more vehicles. Further, the computer-implemented method may include a fourth step of analyzing the first set of data, the second set of data and the third set of data. Furthermore, the computer-implemented method may include a fifth step of searching the availability of at least one driver of the plurality of drivers at the determined one or more pit stops. The searching is done to allocate the vehicle of the one or more vehicles driven by a first driver driving for a first distance of the travel route to a second driver for driving the vehicle for a second distance. Moreover, the computer implemented method may include a sixth step of allocating the available driver of the plurality of drivers to drive the vehicle of the one or more vehicles for trip distance between a first pit stop to a second pit stop. The first set of data may be received in real time. In addition, the second set of data may be collected from one or more sensors installed in the one or more vehicles. Each of the one or more vehicles may be associated with a driver of the plurality of drivers. The second set of data may be collected in real time. Further, the one or more trip plans may corresponds to travel route from a source location to a destination location. The third set of data may be gathered in real time. Furthermore, the analyzing may be done in real time. Also, the one or more pit stops may be determined based on the analysis of the first set of data, the second set of data and the third set of data. In addition, the searching may be done in real time. Further, the allocating may be done based on the analysis of the first set of data, the second set of data and the third set of data.

In an embodiment of the present disclosure, the computer implemented method includes the first set of data. The first set of data may be associated with plurality of drivers. The first set of data may include bibliographic information of the driver of the plurality of drivers. In addition, the first set of data may include one or more routes covered by each driver of the plurality of drivers in past years. Further, the first set of data may include experience of each driver of the plurality of drivers in field of driving. Furthermore, the first set of data may include working hours for each of the plurality of drivers. Also, the first set of data may include data related to driving license of the plurality of drivers. In addition, the first set of data may include one or more famous places nearby the address of each driver of the plurality of drivers. Further, the first set of data may include current location of each driver of the plurality of drivers. The bibliographic information may include name, age, contact details, permanent address and alternative address of each driver of the plurality of drivers.

In an embodiment of the present disclosure, the computer implemented method includes the second set of data. The second set of data may be associated with the one or more vehicles travelling from one point to another. In addition, the second set of data may include type of the one or more vehicles. Further, the second set of data may include current status of the one or more vehicles. Furthermore, the second set of data may include position of the one or more vehicles. Also, the second set of data may include working status of the one or more vehicles. In addition, the second set of data may include fuel level of the one or more vehicles. Further, the second set of data may include and internal and external condition of the one or more vehicles.

In an embodiment of the present disclosure, the computer implemented method includes the third set of data. The third set of data may be associated with the one or more trip plans. In addition, the third set of data may include data related to one or more pit stops. Further, the third set of data may include data of one or more alternate routes. Furthermore, the third set of data may include the data of one or more toll tax. Also, the third set of data may include the data of one or more food places and one or more fuel filling stations in each trip plan of the one or more trip plans.

In an embodiment of the present disclosure, the computer implemented method may include creation of the profile for each driver of the plurality of drivers based on the first set of data, rank of the driver, position of the driver. In addition, the profile of each driver of the plurality of drivers may be created to choose a suitable driver for one or more vehicles in each trip plan of the one or more trip plans.

In an embodiment of the present disclosure, the computer implemented method may include storage of the first set of data, the second set of data and the third set of data. In addition, the computer implemented method may include storage of the profile of each driver of the plurality of drivers and the data corresponding to the plurality of drivers available at the one or more pit stops. The storage may be done in real time.

In an embodiment of the present disclosure, the computer implemented method may include updating of the first set of data, the second set of data and the third set of data. In addition, the computer implemented method may include updating of the profile of each driver of the plurality of drivers and the data corresponding to the plurality of drivers available at the one or more pit stops. The updating may be done in real time.

In an embodiment of the present disclosure, the computer implemented method may include determination of entropy for multiple vehicles travelling in multiple routes. In addition, the entropy may correspond to the occurrence of the disruptions in the trip plan of the one or more trip plans. The entropy may be calculated in real time.

In an embodiment of the present disclosure, the computer implemented method may include a feedback mechanism. In addition, the feedback mechanism may be used to optimize the trip plan of the one or more trip plans by reducing the entropy when the entropy is more than a threshold value. The feedback mechanism may be performed in real time.

In an embodiment of the present disclosure, the computer implemented method may reduce the entropy by reallocating the driver of the plurality of drivers in the one or more vehicles at one or more places. In addition, the one or more places may correspond to the place of occurrence of the entropy.

In a second example, a computer system is provided. The computer system may include one or more processors and a memory coupled to the one or more processors. The memory may store instructions which, when executed by the one or more processors, may cause the one or more processors to perform a method. The method for determining availability of one or more drivers at one or more pit stops for driving one or more vehicles. The one or more vehicles include one or more sensors. The method may include a first step of receiving a first set of data associated with a plurality of drivers. In addition, the method may include a second step of collecting a second set of data associated with vehicle of one or more vehicles travelling from one point to another. Moreover, the method may include a third step of gathering a third set of statistical data associated with a trip plan of one or more trip plans associated with each vehicle of the one or more vehicles. Further, the method may include a fourth step of analyzing the first set of data, the second set of data and the third set of data. Furthermore, the method may include a fifth step of searching the availability of at least one driver of the plurality of drivers at the determined one or more pit stops. The searching is done to allocate the vehicle of the one or more vehicles driven by a first driver driving for a first distance of the travel route to a second driver for driving the vehicle for a second distance. Moreover, the method may include a sixth step of allocating the available driver of the plurality of drivers to drive the vehicle of the one or more vehicles for trip distance between a first pit stop to a second pit stop. The first set of data may be received in real time. In addition, the second set of data may be collected from one or more sensors installed in the one or more vehicles. Each of the one or more vehicles may be associated with a driver of the plurality of drivers. The second set of data may be collected in real time. Further, the one or more trip plans may corresponds to travel route from a source location to a destination location. The third set of data may be gathered in real time. Furthermore, the analyzing may be done in real time. Also, the one or more pit stops may be determined based on the analysis of the first set of data, the second set of data and the third set of data. In addition, the searching may be done in real time. Further, the allocating may be done based on the analysis of the first set of data, the second set of data and the third set of data.

In an embodiment of the present disclosure, the method may include the first set of data. The first set of data may be associated with plurality of drivers. The first set of data may include bibliographic information of the driver of the plurality of drivers. In addition, the first set of data may include one or more routes covered by each driver of the plurality of drivers in past years. Further, the first set of data may include experience of each driver of the plurality of drivers in field of driving. Furthermore, the first set of data may include working hours for each of the plurality of drivers. Also, the first set of data may include data related to driving license of the plurality of drivers. In addition, the first set of data may include one or more famous places nearby the address of each driver of the plurality of drivers. Further, the first set of data may include current location of each driver of the plurality of drivers. The bibliographic information may include name, age, contact details, permanent address and alternative address of each driver of the plurality of drivers.

In an embodiment of the present disclosure, the method may include the second set of data. The second set of data may be associated with the one or more vehicles travelling from one point to another. In addition, the second set of data may include type of the one or more vehicles. Further, the second set of data may include current status of the one or more vehicles. Furthermore, the second set of data may include position of the one or more vehicles. Also, the second set of data may include working status of the one or more vehicles. In addition, the second set of data may include fuel level of the one or more vehicles. Further, the second set of data may include and internal and external condition of the one or more vehicles.

In an embodiment of the present disclosure, the method may include the third set of data. The third set of data may be associated with the one or more trip plans. In addition, the third set of data may include data related to one or more pit stops. Further, the third set of data may include data of one or more alternate routes. Furthermore, the third set of data may include the data of one or more toll tax. Also, the third set of data may include the data of one or more food places and one or more fuel filling stations in each trip plan of the one or more trip plans.

In an embodiment of the present disclosure, the method may include creation of the profile for each driver of the plurality of drivers based on the first set of data, rank of the driver, position of the driver. In addition, the profile of each driver of the plurality of drivers may be created to choose a suitable driver for one or more vehicles in each trip plan of the one or more trip plans.

In an embodiment of the present disclosure, the method may include storage of the first set of data, the second set of data and the third set of data. In addition, the method may include storage of the profile of each driver of the plurality of drivers and the data corresponding to the plurality of drivers available at the one or more pit stops. The storage may be done in real time.

In an embodiment of the present disclosure, the method may include updating of the first set of data, the second set of data and the third set of data. In addition, the method may include updating of the profile of each driver of the plurality of drivers and the data corresponding to the plurality of drivers available at the one or more pit stops. The updating may be done in real time.

In an embodiment of the present disclosure, the method may include determination of entropy for multiple vehicles travelling in multiple routes. In addition, the entropy may correspond to the occurrence of the disruptions in the trip plan of the one or more trip plans. The entropy may be calculated in real time.

In an embodiment of the present disclosure, the method may include a feedback mechanism. In addition, the feedback mechanism may optimize the trip plan of the one or more trip plans by reducing the entropy when the entropy is more than a threshold value. The feedback mechanism may be performed in real time.

In an embodiment of the present disclosure, the method may reduce the entropy by reallocating the driver of the plurality of drivers in the one or more vehicles at one or more places. In addition, the one or more places may correspond to the place of occurrence of the entropy.

In a third example, a computer-readable storage medium is provided. The computer-readable storage medium encodes computer executable instructions that, when executed by at least one processor, performs a method. The method for determining availability of one or more drivers at one or more pit stops for driving one or more vehicles. The one or more vehicles include one or more sensors. The method may include a first step of receiving a first set of data associated with a plurality of drivers. In addition, the method may include a second step of collecting a second set of data associated with vehicle of one or more vehicles travelling from one point to another. Moreover, the method may include a third step of gathering a third set of statistical data associated with a trip plan of one or more trip plans associated with each vehicle of the one or more vehicles. Further, the method may include a fourth step of analyzing the first set of data, the second set of data and the third set of data. Furthermore, the method may include a fifth step of searching the availability of at least one driver of the plurality of drivers at the determined one or more pit stops. The searching is done to allocate the vehicle of the one or more vehicles driven by a first driver driving for a first distance of the travel route to a second driver for driving the vehicle for a second distance. Moreover, the method may include a sixth step of allocating the available driver of the plurality of drivers to drive the vehicle of the one or more vehicles for trip distance between a first pit stop to a second pit stop. The first set of data may be received in real time. In addition, the second set of data may be collected from one or more sensors installed in the one or more vehicles. Each of the one or more vehicles may be associated with a driver of the plurality of drivers. The second set of data may be collected in real time. Further, the one or more trip plans may corresponds to travel route from a source location to a destination location. The third set of data may be gathered in real time. Furthermore, the analyzing may be done in real time. Also, the one or more pit stops may be determined based on the analysis of the first set of data, the second set of data and the third set of data. In addition, the searching may be done in real time. Further, the allocating may be done based on the analysis of the first set of data, the second set of data and the third set of data.

BRIEF DESCRIPTION OF THE FIGURES

Figure 1:
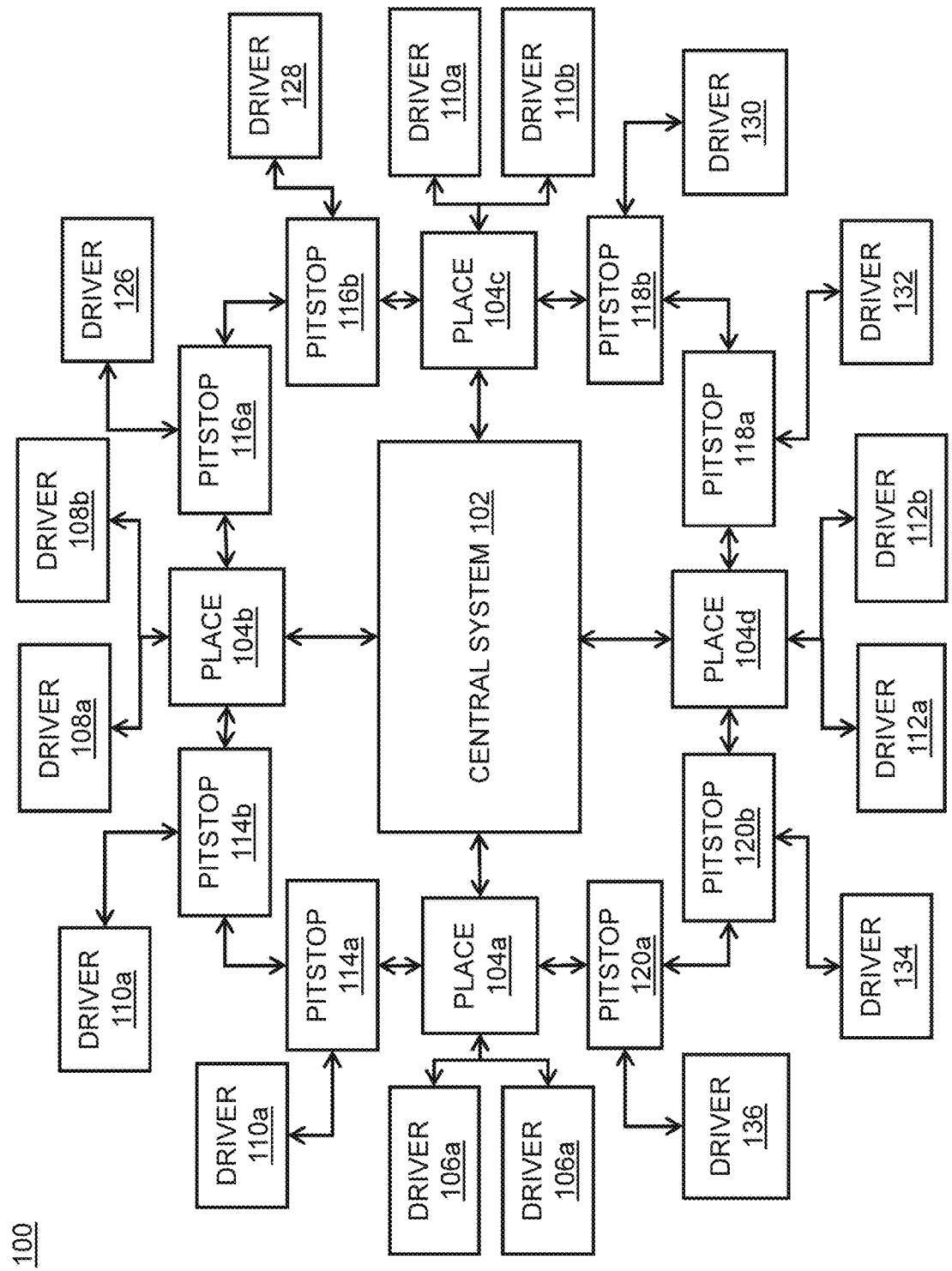
Figure 2:
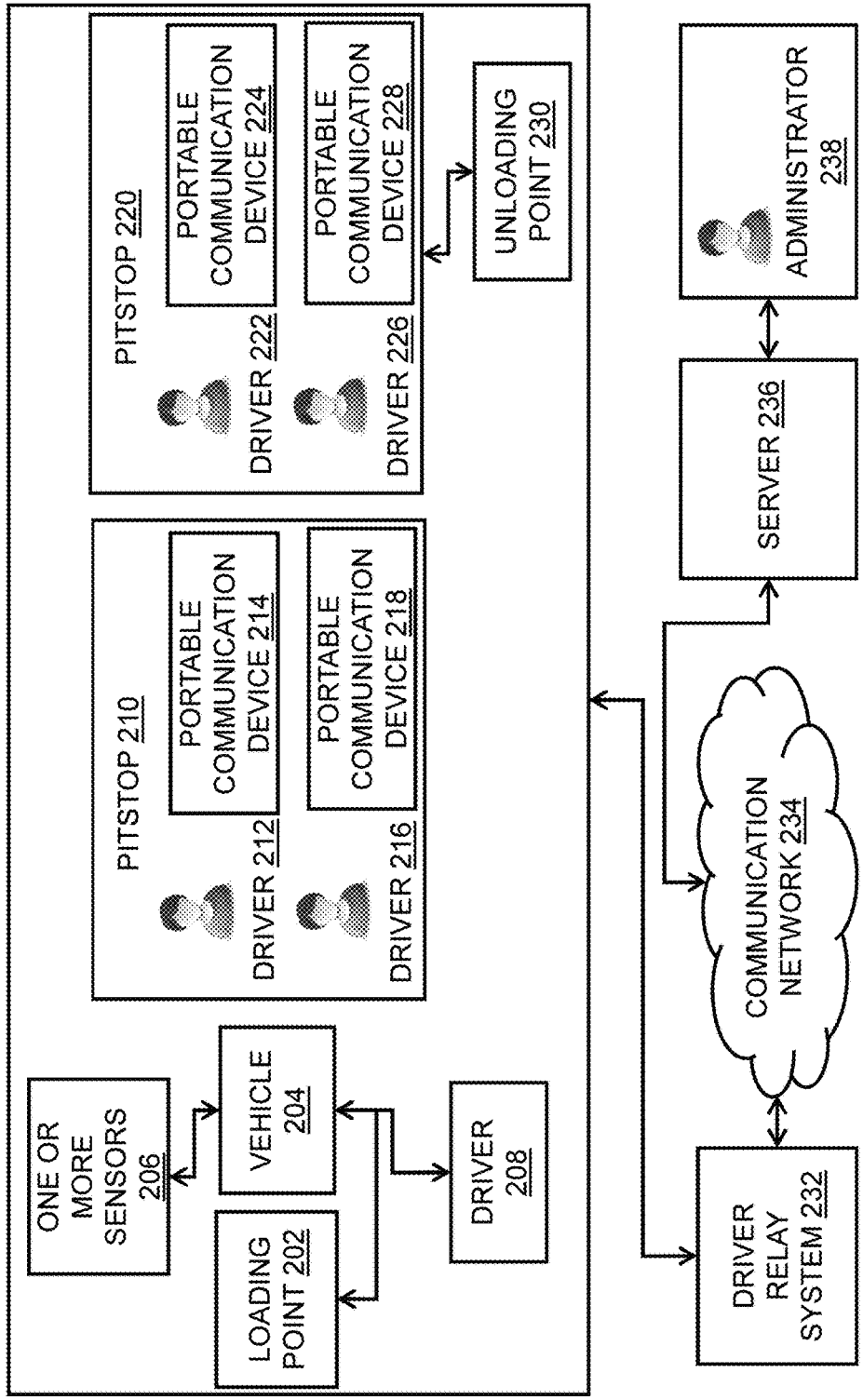
Figure 3A:
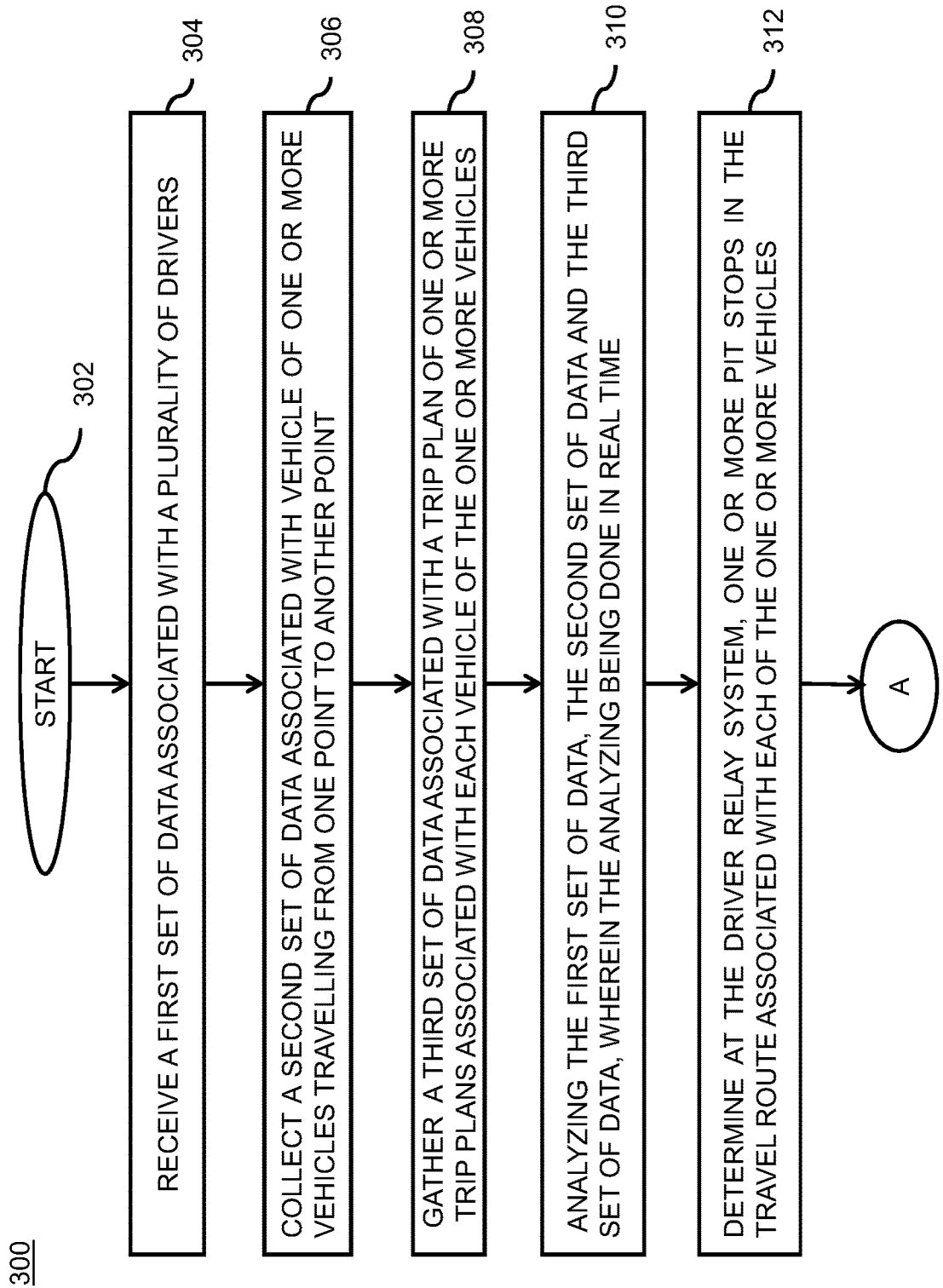
Figure 3B:
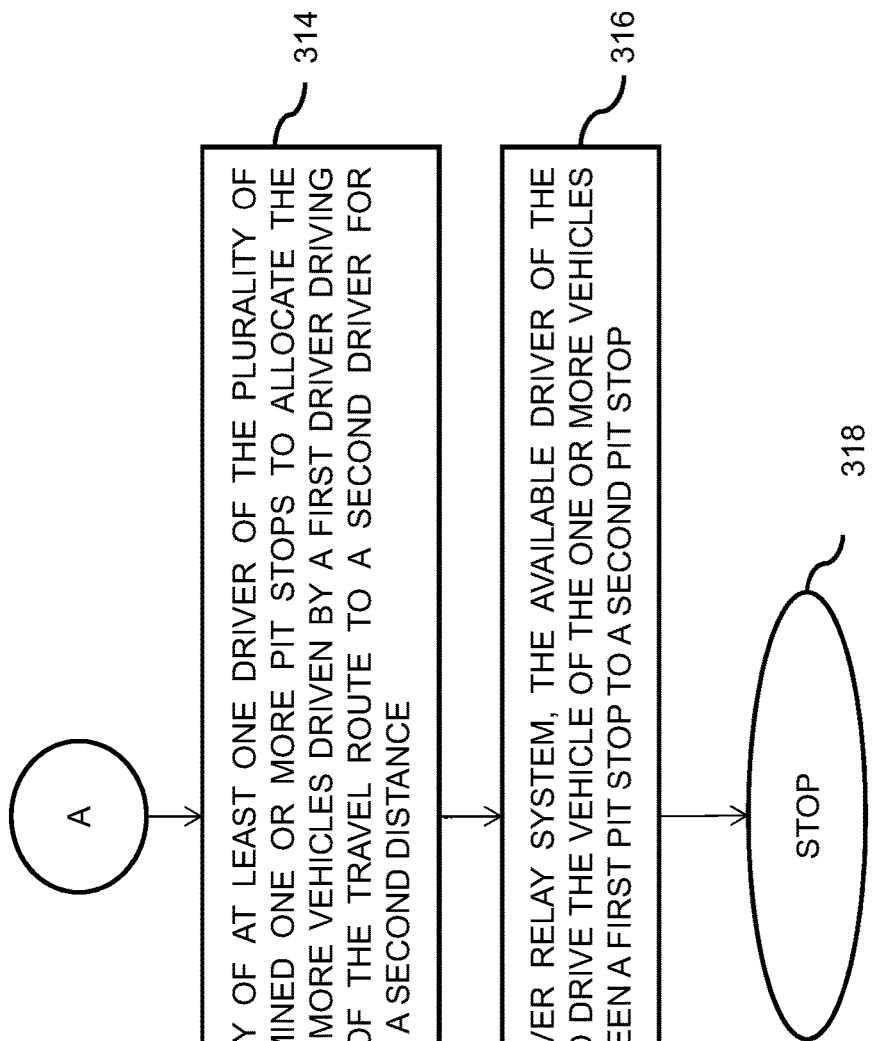
Figure 4:
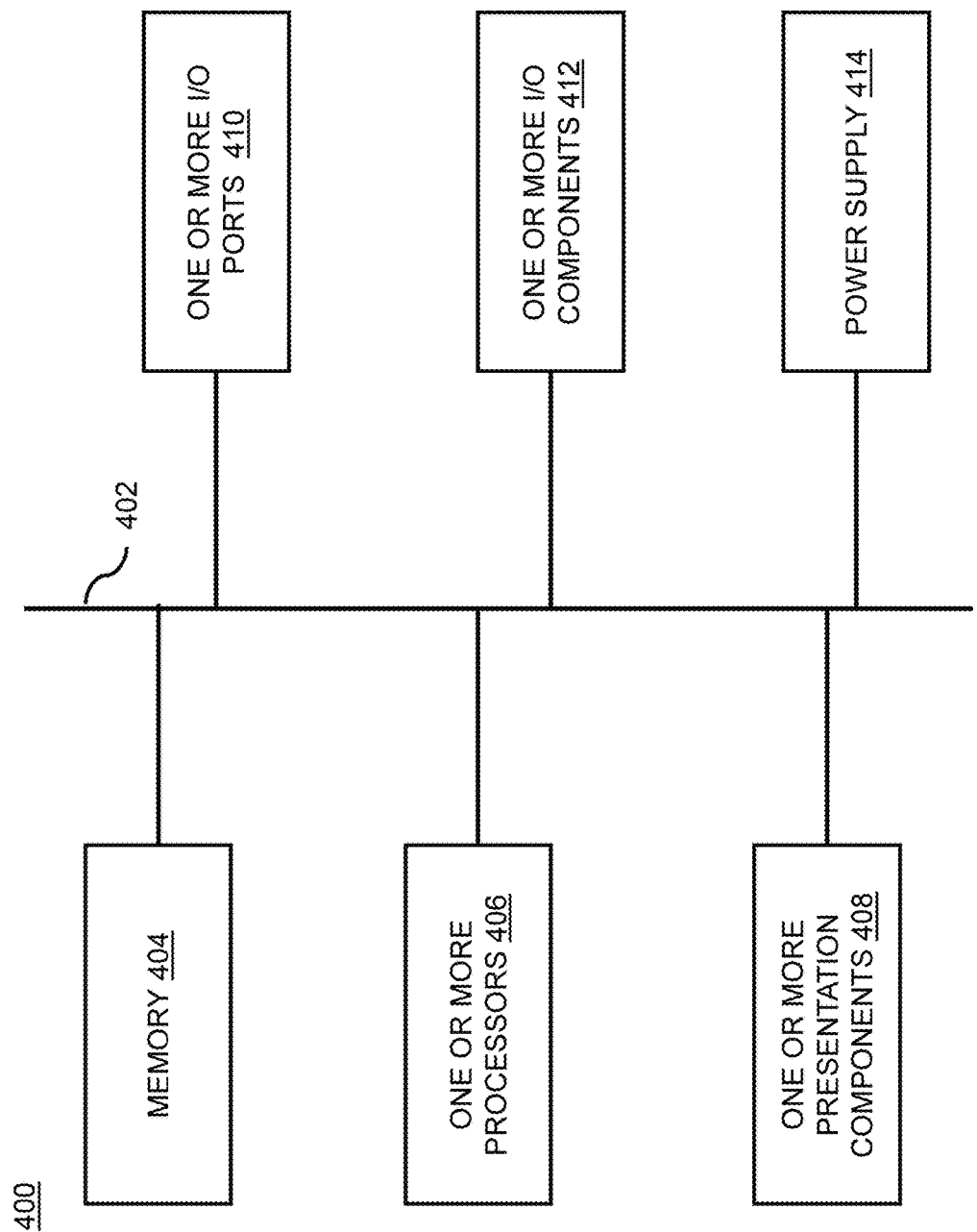

Having thus described the invention in general terms, reference will now be made to the accompanying drawings, which are not necessarily drawn to scale, and wherein:

FIG. 1 illustrates a general overview of a logistic system, in accordance with various embodiments of the present disclosure;

FIG. 2 illustrates a block diagram of an interactive computing environment for a driver relay system, in accordance with various embodiments of the present disclosure;

FIGS. 3A and 3B illustrate a flow chart of a method for determining the real time availability of one or more drivers at one or more pit stops, in accordance with various embodiments of the present disclosure; and FIG. 4 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates a general overview of a logistic system 100 for determining the availability of one or more drivers at one or more pit stops for driving one or more vehicles. The logistic system 100 includes a central system 102, a plurality of places 104*a*-104*d* and a plurality of drivers. In addition, the logistic system 100 includes a plurality of pit stops. In an embodiment of the present disclosure, the logistic system 100 includes the central system 102. The central system 102 determines number of pit stops in between the plurality of places 104*a*-104*d*. In addition, the central system 102 selects a right driver at one or more pit stops to drive the one or more vehicles. Further, the central system 102 monitors one or more vehicles travelling from a source place to a destination place.

In an embodiment of the present disclosure, the logistic system 100 includes the plurality of places 104a-104d from where the one or more vehicles travel from one place to another place. In addition, the plurality of places 104a-104d includes the place for loading and unloading the plurality of goods. Further, the plurality of places 104a-104d includes a source place and a destination place for the one or more vehicles. Each place of the plurality of places 104a-104d is associated with the plurality of drivers to drive the one or more vehicles from the source place to the destination place.

In an embodiment of the present disclosure, the place 104a is associated with a driver 106a and a driver 106b. In addition, the place 104b is associated with a driver 108a, and a driver 108b. Further, the place 104c is associated with a driver 110a and a driver 110b. Moreover, the place 104d is associated with a driver 112a and a driver 112b. In another embodiment of the present disclosure, the logistic system 100 may include any number of places and each place may associate with any suitable number of drivers.

In an embodiment of the present disclosure, the logistic system 100 includes the plurality of drivers to drive the one or more vehicles. The plurality of drivers includes a person or individual who know how to drive the one or more vehicles. In an embodiment of the present disclosure, the plurality of drivers are the drivers having good skills and experience in the field of driving. In an example, each of the plurality of drivers holds an experience of 1 year, 2 years, 5 years and the like. In addition, each of the plurality of drivers knows the route of their destination location. Each of the plurality of drivers uses a communication device with internet connection to provide the route of their destination. Further, each of the plurality of drivers holds a license of driving. In an embodiment of the present disclosure, each of the plurality of drivers drives the one or more vehicles for a fixed distance. In another embodiment of the present disclosure, each of the plurality of driver drives the one or more vehicles for a fixed interval of time. In yet another embodiment of the present disclosure, each of the plurality of driver drives the one or more vehicles to travel from one pit stop to another pit stop.

The logistic system 100 includes one or more pit stops in between the source point and the destination point. The one or more pit stops are the places to change the driver. In addition, the one or more pit stops are the places from where a first driver driving the vehicle from source place handover the same vehicle to a second driver for covering the next distance. Further, the one or more pit stops are the zones from where the second driver continues to drive the same vehicle driven by the first driver to reach at next pit stop. Moreover, the one or more pit stops are the places from where the first driver is replaced by the second driver to drive the same vehicle for the fixed distance. Each pit stop of the one or more pit stops is associated with one or more drivers to replace the first driver. In an example the one or more pit stops include any hotel, restaurant, petrol pump, any famous place, any hub, any logistic firm, any office, any station and the like. In addition, the one or more pit stops may be any environment surrounded by the plurality of drivers. Further, the one or more pit stops are the places from where the one or more drivers are assigned for the next upcoming duty. The one or more pit stops include the one or more drivers to drive the vehicles. In addition, each driver of the one or more drivers has one or more communication devices to get an alert of next upcoming duty. The next upcoming duty for the one or more drivers is to drive the same vehicles driven by the first driver for the next fixed distance.

In an example, the one or more pit-stops 114a-114b is present in between the place 104a and the place 104b. Each pit stop of the one or more pit stops 114a-114b is associated with the one or more drivers. The pit stop 114a includes a driver 122 and the pit stop 114b includes a driver 124 to drive the vehicle.

In an example, the place 104a is a warehouse located in city X from where the plurality of packages is to be loaded in a truck Z. The plurality of packages have to be unloaded at the place 104b, which is a warehouse located in City Y. The driver 106a is assigned from the plurality of drivers 106a-106b to drive the truck Z from the place 104a. The driver 106a is assigned based on his experience and skills in the field of driving. The distance between the place 104a and the place 104b is calculated by the central system 102 as 2100 kilometers. Further, two pit stops 114a, 114b have been decided by the central system 102 in between the place 104a and the place 104b. Moreover, the total distance of 2100 kilometers is subdivided into three fixed distances. Each fixed distance includes a distance of 700 kilometers. The driver 106a drives the loaded truck from the place 104a and reached at the first pit stop 114a after travelling the fixed distance of 700 kilometers. When the driver 106a is on the way near to the first pit stop 114a, the driver 122 near by the first pit stop 114a got an alert notification message on his mobile for the next upcoming duty of driving the truck. The driver 122 from the one or more drivers is selected by the central system 102 based on his skills and experience to drive the same truck for the next 700 kilometers. The driver 122 from the one or more drivers drives the loaded truck Z from the first pit stop 114a to reach at the second pit stop 114b by covering the fixed distance of 700 kilometers. When the driver 122 from the one or more drivers reach near by the location of second pit stop 114b, one or more drivers near by the second pit stop 114b get the notification alert on their mobile for the next upcoming duty of driving the truck Z. The driver 124 from the one or more drivers is selected by the central system 102 based on his skills and experience in the field of driving to drive the next fixed distance of 700 kilometers. After covering the final distance of 700 kilometers from the second pit stop 114b, the driver 124 from the one or more drivers reached at the place 104b. The truck Z is unloaded at the destination place 104b. Similarly, the one or more vehicles travel from the place 104b, 104c, 104d and 104a.

FIG. 2 illustrates a block diagram 200 of an interactive computing environment for real time determination of the availability of one or more drivers at one or more pit stops, in accordance with various embodiments of the present disclosure. The interactive computing environment includes a loading point 202, a vehicle 204, one or more sensors 206, a driver 208, a first pit stop 210, a second pit stop 220 and an unloading point 230. In addition, the interactive computing environment includes a driver relay system 232, a communication network 234, a server 236 and an administrator 238. Further, the first pit stop 210 includes a first driver 212 holding a potable communication device 214 and a second driver 216 holding a potable communication device 218. Moreover, the second pit stop 220 includes a first driver 222 holding a communication device 224 and a second driver 226 holding a communication device 228.

In an embodiment of the present disclosure, the loading point 202 is the place to load the goods, items and products in one or more vehicles for transportation. In addition, the loading point 202 may include any place from where the plurality of packages having goods, items are to be transported in various other places. Further, the loading point 202 may include the manufacturing location of the one or more products. Moreover, the loading point 202 may include one or more hubs used for transporting the goods, items and products at different places. In an example, the loading point 202 is a warehouse of X place from where the plurality of products having electronic item is to be loaded in the truck D. Each of the plurality of products is loaded in the truck D by a plurality of loaders and a loading device.

In an example, the plurality of products loaded in the vehicle 204 includes one or more electronic units such as televisions, mobile phones, washing machines, refrigerators, air conditioners, speakers and the like. In another example, the plurality of products includes one or more mechanical units such as lathe machines, mechanical tools, wheels, vehicles and the like. In yet another example, the plurality of products includes one or more electrical units such as cables, wires, transformers, switches, plugs, switch boards, batteries, inverters and the like. In yet another example, the plurality of products includes one or more chemical and plastic units such as buckets, oil, brush, tiffin box, cosmetics, plastic chairs and the like. In yet another example, the plurality of products includes one or more food items such as fruits, vegetables, tea, chips, juice, pulse, wheat, grain, and the like. In yet another example, the plurality of products includes one or more tangible items which have to be transported from one place to another place.

In an embodiment of the present disclosure, the plurality of products is loaded in the vehicle 204 from the loading point 202. In general, the vehicle 204 is used to transport the plurality of products, peoples, goods from one place to another place. In addition the vehicle 204 is selected from the one or more vehicles based on the one or more parameters. The one or more parameters include type, size, shape, capacity and strength of the vehicle 204. In an example, the one or more trucks used for the logistics organization are of different types and sizes with different capacities. The one or more trucks include semi-trailer truck, jumbo trailer truck, tail-lift truck, straight truck and the like. In an example, the semi-trailer truck and jumbo trailer truck have the capacity of about 24,000 kg. In another embodiment of the present disclosure, the vehicles having less space, size such as auto, rickshaw, bikes and vans are used for the transportation of a particular number of goods.

In an example, a smart phone manufacturing company loads a plurality of packages having smart phones in a big truck G to deliver the smartphones across the country B. The truck G unloaded the smartphones at the head office of various e-service providers after travelling a long distance. Further, the several e-service providers loaded the smartphone in one or more small vehicles such as vans, cars, and small trucks to fulfill the demand of one or more customers.

The one or more sensors 206 are associated with the vehicle 204 for monitoring of the vehicle 204. In addition, the one or more sensors 206 include the one or more sensing unit to collect various set of data. In an embodiment of the present disclosure, the one or more sensors 206 include one or more geo location sensors. The one or more geo location sensors are used to locate the position of the vehicle 204 in real time. In addition, the one or more geo location sensors are used to calculate a distance traveled by the vehicle 204 in particular interval of time. Further, the one or more geo-location sensors are used to track the positions of the vehicle 204. Moreover, the one or more geo location sensors are used to identify the geographic location of the vehicle 204. Furthermore, the one or more geo-location sensors are used to collect the information such as position and velocity of the vehicle 204 in real time.

In an embodiment of the present disclosure, the one or more geo location sensors are fixed in the cabin of the vehicle 204. In another embodiment of the present disclosure, the one or more geo location sensors are fixed in any suitable position in the vehicle 204. In general, the one or more geo location sensors are receivers with antennas, which use a satellite based navigation system having a network of 24 satellites to provide position and velocity related information in real time. In an embodiment of the present disclosure, the one or more geo location sensors allow the viewer to collect the position and velocity related data of the vehicle 204 on one or more communication devices having an internet connection. In another embodiment of the present disclosure, the one or more sensors 206 include a fuel sensor to measure the fuel level values of the vehicle 204. In addition, the fuel sensors are used to monitor the level of the fuel in the vehicle 204. Further, the fuel sensors are used to detect the one or more fuel pilferage events in the vehicle 204. Furthermore, the fuel sensors are used to carry out remote tank monitoring of the vehicle 204 to determine the fuel consumption. In yet another embodiment of the present disclosure, the one or more sensors 206 include one or more seat-mounted pressure sensors. The one or more seat-mounted pressure sensors are used to measure the pressure applied to the seat to determine the presence of the plurality of drivers driving the vehicle 204. In yet another embodiment of the present disclosure, the one or more sensors 206 include one or more door sensors to monitor door activity, such as the opening and/or closing of the door. In addition, the one or more door sensors used to monitor the locking of the door, the operation of a window of the door, and/or any other suitable door activity event. In yet another embodiment of the present disclosure, the one or more sensors 206 are the sensing devices used for monitoring the vehicle 204 and the plurality of drivers.

In an embodiment of the present disclosure, the vehicle 204 is driven by the driver 208 from the loading point 202. In addition, the driver 208 is an individual or person who knows to drive the vehicle 204. Further, the driver 208 drives the vehicle 204 to transport the goods and products from one place to another place. Furthermore, the driver 208 is the person or individual having driving skills and experience in the field of driving. In addition, the driver 208 is assigned on vehicle 204 to transport the goods from a source point to a destination point. In an embodiment of the present disclosure, the driver 208 is selected from the one or more drivers based on the skills, experience, knowledge, rating, and the like. The driver 208 holds a license of driving to drive the one or more vehicles. The driver 208 drives the vehicle 204 to reach at the first pit stop 208. In addition, the driver 208 drives the vehicle 204 for a fixed distance. Further, the driver 208 drives the vehicle 204 from the loading point 202 to the first pit stop 210. The first pit stop 210 is the first place after the loading point from where the driver 208 is replaced by another driver. The driver who replaces the driver 208 is selected from the group. The group includes the first driver 212 and the second driver 214. In an embodiment of the present disclosure, the selection of next driver is based on the one or more parameters. In an example, the one or more parameters include the profile of the driver, rating of the driver, experience of the driver, one or more routes covered by the driver in past years and the like. Based on the one or more parameters, the first driver 212 is selected from the one or more drivers 212, 216 to cover the next fixed distance. In addition, the first driver 212 holds the portable communication device 214. Further, the first diver 212 accesses the portable communication device 214 in real time. The portable communication device 214 is any type of device which allows the first driver 212 to access the route of his destination point in real time. In addition, the portable communication device 214 is any device having an active internet facility. Examples of the portable communication device 214 include but may not be limited to a smart phone, a tablet, a laptop, a desktop computer, a personal digital assistant and an electronic wearable device. Further, the portable communication device 214 is associated with a specific type of operating system. In an embodiment of the present disclosure, the first driver 212 gets update of his upcoming duty to drive the vehicle 204 through the notification alert on the portable communication device 214. The first driver 212 drives the vehicle 204 from the first pit stop 210 to the second pit stop 220. The first driver 212 drives the vehicle 204 to reach at the second pit stop 220 after travelling a fixed distance. Further, the second pit stop 220 includes the first driver 222 and the second driver 226. In addition, the first driver 222 accesses the portable communication device 224 and the second driver 226 accesses the portable communication device 228. In addition, one of two drivers 222, 226 is selected to continue the trip from second pit stop to the unloading point 230. In an embodiment of the present disclosure, the second driver 226 is selected to replace the first driver 212 based on the one or more parameters. The second driver 226 gets the update of his upcoming duty to drive the vehicle 204 through the notification alert on the portable communication device 228 associated with the second driver 226. The second driver 226 assigned with the duty of driving the vehicle 204 from the second pit stop 220 to the unloading point 230. In an embodiment of the present disclosure, the unloading point 228 is the final destination for the driver 226. Further, the unloading point 230 may be the point where the plurality of products, goods, items is to be unloaded from the vehicle 204. In an example, the unloading point 230 includes but may not be limited to a warehouse, a hub, railway station, bus stand, places of one or more e-service providers, a factory and the like. Further, the number of pit stops and driver availability in between the loading point 202 and unloading point 230 is determined by the driver relay system 232.

The driver relay system 232 determines the availability of the plurality of drivers for driving the vehicle 204 from the loading point 202 to the unloading point 230. In addition, the driver relay system 232 reduces the transit time in long distance transportation by replacing the first driver with second driver on the same vehicle at one or more pit stops. Further the driver relay system 232 determines the entropy of the one or more vehicles moving on one or more routes to check the stability of the driver relay system 232. Moreover, the driver relay system 232 calculates the distance in between the loading point 202 and the unloading point 230. Based on the calculated distance, the driver relay system 232 determines the number and location of one or more pit stops in between the loading point 202 and the unloading point 230. The driver relay system 232 divides the long trip in one or more small trips for each driver of the plurality of driver. Each trip of the one or more trips is a part of the long trip. Thus, each driver of the plurality of driver drives the vehicle 202 for the fixed distance.

In an embodiment of the present disclosure, the driver relay system 232 receives a first set of data in real time. The first set of data is associated with a plurality of drivers. The plurality of drivers knows to drive the vehicle 204. In an embodiment of the present disclosure, the first set of data includes bibliographic information of the plurality of drivers. In an example, the bibliographic information includes but may not be limited to name, age, contact details, permanent address, alternate address, mobile number and the like. In another embodiment of the present disclosure, the first set of data includes the experience of each of the plurality of drivers in the field of driving. In yet another embodiment of the present disclosure, the first set of data includes the information regarding one or more routes covered by the plurality of drivers in past years. In yet another embodiment of the present disclosure, the first set of data includes the data related to the working hours for each driver of the plurality of drivers. In yet another embodiment of the present disclosure, the first set of data includes the data related to the driving license associated with the plurality of drivers. In yet another embodiment of the present disclosure, the first set of data includes the current location of each driver of the plurality of drivers. In yet another embodiment of the present disclosure, the first set of data includes the one or more famous places nearby location of the plurality of drivers. In yet another embodiment of the present disclosure, the first set of data includes all the information which may be used for the selection of a right driver to drive the vehicle 204.

In an embodiment of the present disclosure, the driver relay system 232 collects the second set of data. The second set of data is associated with the vehicle 204. In addition, the second set of data corresponds to the data of the vehicle 204, travelling from the loading point 202 to the unloading point 230. Further, the second set of data is collected from the one or more sensors 206 installed in the vehicle 204. Moreover, the vehicle 204 is associated with the plurality of drivers available in between the loading point 202 and the unloading point 230.

In another embodiment of the present disclosure, the second set of data is collected for the one or more vehicles travelling from one point to another. Each of the one or more vehicles is associated with the plurality of drivers.

In an embodiment of the present disclosure, the second set of data includes current status of the vehicle 202. In another embodiment of the present disclosure, the second set of data includes the position and velocity related data of the vehicle 202 collected by the one or more sensors 204. In yet another embodiment of the present disclosure, the second set of data includes the current working status of the vehicle 202. In yet another embodiment of the present disclosure, the second set of data includes the current fuel level values of the vehicle 202 travelling from the loading point 202 to the unloading point 230. In yet another embodiment of the present disclosure, the second set of data includes the internal and external condition of the vehicle 204. In yet another embodiment of the present disclosure, the second set of data includes the data used to track the vehicle 202.

In an embodiment of the present disclosure, the driver relay system 232 gathers the third set of data. The third set of data is associated with a trip plan of the one or more trip plans. In addition, the one or more trip plans are associated with the vehicle 202. Further, the trip plan is used for the vehicle 202 travelling from the loading point 202 to the unloading point 230 to optimize the trip. Moreover, the trip plan corresponds to the travel route for the vehicle 204 travelling from the loading point 202 to the unloading point 230. Also, the third set of data is gathered in real time by the driver relay system 232. The third set of data includes the data of the distance between the loading point 202 and the unloading point 230. In addition, the third set of data includes the data related to the one or more pit stops present in between the loading point 202 and the unloading point 230. Further, the third set of data includes the data of the one or more alternate routes available in between the loading point 202 and the unloading point 230. Moreover, the third set of data includes the data related to one or more toll tax, one or more food places and one or more fuel filling station present in between the loading point 202 and the unloading point 230. In another embodiment of the present disclosure, the third set of data includes the data used to optimize each trip plan of the one or more trip plans.

The driver relay system 232 analyzes the first set of data, the second set of data and the third set of data to optimize the trip plan for the vehicle 204 travelling from the loading point 202 to the unloading point 230. The analyzing of the first set of data, the second set of data and the third set of data is done in real time. Further, the driver relay system 232 determines the location of the one or more pit stops in between the loading point 202 and the unloading point 230. In addition, the driver relay system 232 determines the number of pit stops may be present in between the loading point 202 and the unloading point 230. In an embodiment of the present disclosure, the driver relay system 232 determines two pit stops in between the loading point 202 and the unloading point 230. In another embodiment of the present disclosure, the driver relay system 232 may determines one or more pit stops in between the loading point 202 and the unloading point 230. Further, the one or more pit stops determined by the driver relay system 232 based on the analysis of the first set of data, the second set of data and the third set of data. Moreover, the driver relay system 232 determines the one or more pit stops based on the availability of one or more driver in between the loading point 202 and the unloading point 230. Also, the driver relay system 232 determines the one or more pit stops based on the distance of the trip of the one or more trips.

The driver relay system 232 searches for the availability of at least one driver of the plurality of drivers at the one or more pit stops. Further, the searching of the at least one driver of the plurality of drivers is done to cover the next fixed distance of the travel route. The searching of the at least one driver of the plurality of drivers is done in real time. In an embodiment of the present disclosure, the driver relay system 232 identifies two drivers at each pit stop to drive the vehicle 204. One driver from the two drivers at each pit stop is assigned with the duty of driving the vehicle 204 to continue the trip for the fixed distance. The searching of the at least one driver of the plurality of drivers at first pit stop 210 is done to allocate the vehicle 202 driven by the driver 208 to first driver 212 present at the first pit stop 210. In addition, the searching of the at least one driver of the plurality of drivers at second pit stop 220 is done to allocate the vehicle 202 driven by the first driver 212 to the second driver 226 present at the second pit stop 220. In another embodiment of the present disclosure, the driver relay system 232 may identify plurality of drivers at each pit stop of the one or more pit stops to continue the trip of the one or more trips. The driver relay system 232 allocates the available driver of the plurality of drivers to drive the vehicle 204. The allocation of the available driver of the plurality of drivers at one or more pit stops is done to drive the vehicle 204 for trip distance between the first pit stop 210 to the second pit stop 220. In an embodiment of the present disclosure, the first driver 212 is allocated by the driver relay system 232 to drive the vehicle 204 from the first pit stop 210 to the second pit stop 220. The allocation of the first driver 212 is done based on the analysis of the first set of data, the second set of data and the third set of data. In addition, the allocation of the driver 212 of the one or more drivers 212, 216 at first pit stop 210 are based on the profile of the driver 212. The driver relay system 232 creates the profile for each driver of the plurality of drivers based on the first set of data. In addition, the driver relay system 232 creates the profile of each driver of the plurality of drivers based on the rank of the driver, position of the driver. Further, the driver relay system 232 creates the profile of each driver of the plurality of drivers in real time to select the right driver of the plurality of drivers for next duty of driving the vehicle 204. Moreover, the selection of right driver is based on one or more parameters. The one or more parameters include equitable distribution of driving hours, rest hours and the transit hours. Also, the selection of the right driver of the plurality of drivers is based on the performance of the driver on one or more routes covered by the driver in past years.

In an embodiment of the present disclosure, the driver relay system 232 facilitates fast changeover of drivers at one or more pit stops. In addition, the driver relay system 232 checks the documents that needs to be handover to the second driver from the first drive at one or more pit stops. Further, the driver relay system 232 auto inform about the status of the vehicle 204 to the one or more drivers available at one or more pit stops. Furthermore, the driver relay system 232 calculates the cash requirement for the driver driving the vehicle 204. In an example, the cash is required for filling fuel, for toll tax and to buy food in between the loading point 202 and the unloading point 230. Also, the driver relay system 232 allows ownership to be transferred with accountability in a very short time. In example, the ownership includes the one or more documents associated with the vehicle 204.

In an embodiment of the present disclosure, the driver relay system 232 determines the entropy of the vehicle 202 travelling from the loading point 202 to the unloading point 230. In addition, the driver relay system 232 determines the entropy of the vehicle 202 to observe any undesired change in the vehicle 204 travelling from the loading point 202 to the unloading point 230. Further, the driver relay system 232 determines the entropy to observe any disruption in the trip plan for the vehicle 204 travelling from the loading point 202 to the unloading point 230. The entropy in the driver relay system 232 corresponds to the occurrence of one or more undesirable changes or disruptions. In an example, the one or more undesirable changes include shortage of driver at one or more pit stops, excess of driver at any other one or more pit stops. In another example, the one or more undesirable changes includes problem with the working of vehicle 204 and deflection of vehicle 204 on one or more inappropriate route. In yet another example, the one or more undesirable changes include accident of vehicle 204 with other one or more vehicles and unavailability of one or more drivers. In yet another example, the one or more undesirable changes include problem in handover the documents from the first driver to the next driver at one or more pit stops. The shortage or excess of drivers at one or more pit stops affects the stability of the driver relay system 232. The entropy of the driver relay system 232 is determined in real time.

In an embodiment of the present disclosure, when the value of the entropy determined is less than the threshold value, the driver relay system 232 is considered as stable system. In another embodiment of the present disclosure, when the value of the entropy determined is more than the threshold value, the driver relay system 232 is considered as unstable system. In addition, the threshold value is an arbitrary value used to decide the stability of the driver relay system 232.

In an example, the vehicle Y is moving from a first point to a second point. Two pit stops are determined by the driver relay system 232 in between the first point and the second point. When the driver A reached at the first pit stop from the first point, the driver B from the one or more drivers takeover the vehicle Y to reached at the second pit stop. Further, when the driver B reached at the second pit stop, the driver C from the one or more drivers takeover the vehicle Y to reached at the second point. The driver C faces a minor problem with vehicle Y on the way to the second point. Thus, due to the problem with vehicle Y, it took more time to reach at second point. Moreover, the difference between the expected time and real time is not as much that it may affect the driver relay system 232. Thus the driver relay system considered as the stable system.

In another example, the vehicle Z is moving from a first point to a second point. Two pit stops are determined by the driver relay system 232 in between the first point and the second point. When the driver A reached at the first pit stop from the first point, the driver B from the one or more drivers takeover the vehicle Z to reached at the second pit stop. Further the driver relay system 232 determines the shortage of driver at the second pit stop. Thus, when the driver B reached at the second pit stop, it took more time to handover the vehicle Z to another driver C at the second pit stop. Finally, the driver C reached at the second point after a long time. Thus, due to the shortage of driver at second pit stop, it took more time to reach the driver C at the second point. Moreover, the difference between the expected time and real time is found to be more enough that it affect the driver relay system 232. Thus the driver relay system considered as the unstable system.

The driver relay system 232 includes a feedback mechanism to optimize the trip plan of the one or more trip plans. The feedback mechanism is used to optimize the trip plan of the one or more trip plans by reducing the entropy of the driver relay system 232. In addition, the feedback mechanism works when the entropy of the driver relay system becomes more than the threshold value. Further, the feedback mechanism is done in real time. In an example, the entropy of the driver relay system is reduced by reallocating the driver of the plurality of drivers in the vehicle 204 at one or more place. The one or more places correspond to the place of occurrence of the entropy. Moreover, the feedback mechanism predicts the accurate time and place of the occurrence of the entropy in between the one or more trips when the value of the entropy is found to be more than the threshold value.

In an example, three pit stops A, B and C are determined in between the loading point and the unloading point. The feedback mechanism predicts the shortage of drivers at pit stop B and excess of drivers at pit stops A and C. The system got the alert notification on the one or more communication devices related to the shortage of drivers at pit stop B. Thus the system sends the alert notification at the pit stop A and C to move the one or more drivers at pit stop B to make the system stable.

The driver relay system 232 is associated with the server 236 through the communication network 234. In an embodiment of the present disclosure, the communication network 234 enables the driver relay system 232 to gain access to the internet for transmitting data to the server 214. Moreover, the communication network 232 provides a medium to transfer the data between the driver relay system 232 and the server 236. Further, the medium for communication may be infrared, microwave, radio frequency (RF) and the like.

In an embodiment of the present disclosure, the driver relay system 232 is located in the server 236. In another embodiment of the present disclosure, the driver relay system 232 is located in any portable communication device. The server 236 handles each operation and task performed by the driver relay system 232. The server 236 stores one or more instructions for performing the various operations of the driver relay system 232. The driver relay system 232 is associated with the administrator 238. The administrator 238 is any person or individual who monitors the working of the driver relay system 232 in real time. In an embodiment of the present disclosure, the administrator 238 monitors the working of the driver relay system 232 through a portable communication device. The portable communication device includes a laptop, a desktop computer, a tablet, a personal digital assistant and the like.

In an embodiment of the present disclosure, the driver relay system 232 stores the first set of data, the second set of data and the third set of data. In addition, the driver relay system 232 stores the profile of each driver of the plurality of drivers. Further, the driver relay system 232 stores the data corresponding to the plurality of drivers available at the one or more pit stops. Also, the driver relay system 232 stores the data related to the plurality of drivers available in between the loading point 202 and the unloading point 230, the vehicle 204 and the trip plan in real time. In another embodiment of the present disclosure, the driver relay system 232 stores all the information used for allocating the right driver for the upcoming trip.

In an embodiment of the present disclosure, the driver relay system 232 updates the first set of data, the second set of data and the third set of data. In addition, the driver relay system 232 updates the profile of each driver of the plurality of drivers. Further, the driver relay system 232 updates the data corresponding to the plurality of drivers available at the one or more pit stops. Also, the driver relay system 232 updates the data related to the plurality of drivers available in between the loading point 202 and the unloading point 230, the vehicle 204 and the trip plan in real time. In another embodiment of the present disclosure, the driver relay system 232 updates all the information used for allocating the right driver for the upcoming trip.

FIGS. 3A and 3B illustrate a flow chart 300 of a method for determining the availability of one or more drivers at one or more pit stops for driving one or more vehicles, in accordance with various embodiments of the present disclosure. It may be noted that to explain the process steps of flowchart 300, references will be made to the system elements of FIG. 1 and FIG. 2. It may also be noted that the flowchart 300 may have lesser or more number of steps.

The flowchart 300 initiates at step 302. Following step 302, at step 304, the driver relay system 232 receives the first set of data associated with the plurality of drivers. At step 306, the driver relay system 232 collect the second set of data associated with the vehicle of one or more vehicles travelling from one point to another point. At step 308, the driver relay system 232 gathers the third set of data associated with the trip plan of the one or more trip plans associated with each vehicle of the one or more vehicles. At step 310, the driver relay system 232 analyzes the first set of data, the second set of data and the third set of data. At step 312, the driver relay system 232 determines the one or more pit stops in the travel route associated with each of the one or more vehicles. At step 314, the driver relay system 232 searches the availability of at least one driver of the plurality of drivers at the determined one or more pit stops to allocate the vehicle of the one or more vehicles driven by a first driver driving for a first distance of the travel route to a second driver for driving the vehicle for a second distance. At step 316, the driver relay system 232 allocates the available driver of the plurality of drivers to drive the vehicle of the one or more vehicles for trip distance between a first pit stop to a second pit stop. The flow chart 300 terminates at step 318.

FIG. 4 illustrates a block diagram of a computing device 400, in accordance with various embodiments of the present disclosure. The computing device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device 400 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the computing device 400 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The computing device 400 includes one or more processors that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the computing device 400 to be logically coupled to other devices including the one or more I/O components 412, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. A computer-implemented display method for determining availability of one or more drivers at one or more pit stops for driving one or more vehicles, the one or more vehicles having one or more sensors, the computer-implemented method comprising:

receiving, at a driver relay system with a processor, a first set of data associated with a plurality of drivers, wherein the first set of data being received in real time;

collecting, at the driver relay system with the processor, a second set of data associated with vehicle of the one or more vehicles travelling from one point to another point, wherein the second set of data being collected from the one or more sensors installed in the one or more vehicles; wherein each of the one or more vehicles being associated with a driver of the plurality of drivers and wherein the second set of data being collected in real time;

gathering, at the driver relay system with the processor, a third set of data associated with a trip plan of one or more trip plans associated with each vehicle of the one or more vehicles, wherein the one or more trip plans corresponds to travel route from a source location to a destination location and wherein the third set of data being gathered in real time;

analyzing, at the driver relay system with the processor, the first set of data, the second set of data and the third set of data, wherein the analyzing being done in real time;

creating, at the driver relay system with the processor, a profile for each driver of the plurality of drivers based on the first set of data, rank of the driver, position of the driver, wherein the profile of each driver of the plurality of drivers being created to choose a suitable driver for the one or more vehicles in each trip plan of the one or more trip plans;

determining, at the driver relay system with the processor, one or more pit stops in the travel route associated with each of the one or more vehicles, wherein the one or more pit stops being determined based on the analysis of the first set of data, the second set of data and the third set of data;

searching, at the driver relay system with the processor, the availability of at least one driver of the plurality of drivers at the determined one or more pit stops to allocate the vehicle of the one or more vehicles driven by a first driver driving for a first distance of the travel route to a second driver for driving the vehicle for a second distance, wherein the searching being done in real time;

allocating, at the driver relay system with the processor, the available driver of the plurality of drivers to drive the vehicle of the one or more vehicles for trip distance between a first pit stop to a second pit stop, wherein the allocating being done based on the analysis of the first set of data, the second set of data and the third set of data; and determining, at the driver relay system with the processor, entropy for the one or more vehicles travelling in multiple routes, wherein the entropy corresponds to the occurrence of the disruptions in the trip plan of the one or more trip plans and wherein the entropy being calculated in real time.

2. The computer implemented display method as recited in claim 1, wherein the first set of data associated with plurality of drivers comprises bibliographic information of the driver of the plurality of drivers, one or more routes being covered by each driver of the plurality of drivers in past years, experience of each driver of the plurality of drivers in field of driving, working hours for each of the plurality of drivers, driving license of the plurality of drivers, one or more famous places nearby the address of each driver of the plurality of drivers and current location of each driver of the plurality of drivers and wherein the bibliographic information comprises name, age, contact details, permanent address and alternative address of each driver of the plurality of drivers.

3. The computer implemented display method as recited in claim 1, wherein the second set of data associated with the one or more vehicles travelling from one point to another point comprises type of the one or more vehicles, current status of the one or more vehicles, position of the one or more vehicles, working status of the one or more vehicles, fuel level of the one or more vehicles and internal and external condition of the one or more vehicles.

4. The computer implemented display method as recited in claim 1, wherein the third set of data associated with the one or more trip plans comprises one or more pit stops, one or more alternate routes, one or more toll tax, one or more food places and one or more fuel filling stations in each trip plan of the one or more trip plans.

5. The computer implemented display method as recited in claim 1, further comprising storing, at the driver relay system with the processor, the first set of data, the second set of data, the third set of data, the profile of each driver of the plurality of drivers and the data corresponding to the plurality of drivers available at the one or more pit stops and wherein the storing being done in real time.

6. The computer implemented display method as recited in claim 1, further comprising updating, at the driver relay system with the processor, the first set of data, the second set of data, the third set of data, the profile of each driver of the plurality of drivers and the data corresponds to the plurality of drivers available at the one or more pit stops and wherein the updating being done in real time.

7. The computer implemented display method as recited in claim 1, further comprising a feedback mechanism, at the driver relay system with the processor, to optimize the trip plan of the one or more trip plans by reducing the entropy when the entropy being more than a threshold value and wherein the feedback mechanism being performed in real time.

8. The computer implemented display method as recited in claim 1, wherein the entropy being reduced by reallocating the driver of the plurality of drivers in the one or more vehicles at one or more places, wherein the one or more places corresponds to the place of occurrence of the entropy.

9. A computer system comprising:
one or more processors; and
a memory coupled to the one or more processors, the memory for storing instructions which, when executed by the one or more processors, cause the one or more processors to perform a method for determining availability of one or more drivers at one or more pit stops for driving one or more vehicles, the one or more vehicles having one or more sensors, the method comprising:

receiving, at a driver relay system, a first set of data associated with a plurality of drivers, wherein the first set of data being received in real time;

collecting, at the driver relay system, a second set of data associated with vehicle of the one or more vehicles travelling from one point to another point, wherein the second set of data being collected from the one or more sensors installed in the one or more vehicles wherein each of the one or more vehicles being associated with a driver of the plurality of drivers; and wherein the second set of data being collected in real time;

gathering, at the driver relay system, a third set of data associated with a trip plan of one or more trip plans associated with each vehicle of the one or more vehicles, wherein the one or more trip plans corresponds to travel route from a source location to a destination location and wherein the third set of data being gathered in real time;

analyzing, at the driver relay system, the first set of data, the second set of data and the third set of data, wherein the analyzing being done in real time;

creating, at the driver relay system with the processor, a profile for each driver of the plurality of drivers based on the first set of data, rank of the driver, position of the driver, wherein the profile of each driver of the plurality of drivers being created to choose a suitable driver for the one or more vehicles in each trip plan of the one or more trip plans;

determining, at the driver relay system, one or more pit stops in the travel route associated with each of the one or more vehicles, wherein the one or more pit stops being determined based on the analysis of the first set of data, the second set of data and the third set of data;

searching, at the driver relay system, the availability of at least one driver of the plurality of drivers at the determined one or more pit stops to allocate the vehicle of the one or more vehicles driven by a first driver driving for a first distance of the travel route to a second driver for driving the vehicle for a second distance, wherein the searching being done in real time;

allocating, at the driver relay system, the available driver of the plurality of drivers to drive the vehicle of the one or more vehicles for trip distance between a first pit stop to a second pit stop, wherein the allocating being done based on the analysis of the first set of data, second set of data and the third set of data; and determining, at the driver relay system with the processor, entropy for the one or more vehicles travelling in multiple routes, wherein the entropy corresponds to the occurrence of the disruptions in the trip plan of the one or more trip plans and wherein the entropy being calculated in real time.

10. The computer system as recited in claim 9, wherein the first set of data associated with plurality of drivers comprises bibliographic information of the driver of the plurality of drivers, one or more routes being covered by each driver of the plurality of drivers in past years, experience of each driver of the plurality of drivers in field of driving, working hours for each of the plurality of drivers, driving license of the plurality of drivers, one or more famous places nearby the address of each driver of the plurality of drivers and current location of each driver of the plurality of drivers and wherein the bibliographic information comprises name, age, contact details, permanent address and alternative address of each driver of the plurality of drivers.

11. The computer system as recited in claim 9, wherein the second set of data associated with the one or more vehicles travelling from one point to another comprises type of the one or more vehicles, current status of the one or more vehicles, position of the one or more vehicles, working status of the one or more vehicles, fuel level of the one or more vehicles and internal and external condition of the one or more vehicles.

12. The computer system as recited in claim 9, wherein the third set of data associated with the one or more trip plans comprises one or more pit stops, one or more alternate routes, one or more toll tax, one or more food places and one or more fuel filling stations in each trip plan of the one or more trip plans.

13. The computer system as recited in claim 9, further comprising storing, at the driver relay system, the first set of data, the second set of data, the third set of data, the profile of each driver of the plurality of drivers and the data corresponding to the plurality of drivers available at the one or more pit stops and wherein the storing being done in real time.

14. The computer system as recited in claim 9, further comprising updating, at the driver relay system, the first set of data, the second set of data, the third set of data, the profile of each driver of the plurality of drivers and the data corresponds to the plurality of drivers available at the one or more pit stops and wherein the updating being done in real time.

15. The computer system as recited in claim 9, further comprising a feedback mechanism, at the driver relay system, to optimize the trip plan of the one or more trip plans by reducing the entropy when the entropy being more than a threshold value and wherein the feedback mechanism being performed in real time.

16. A non-transitory computer-readable storage medium encoding computer executable instructions that, when executed by at least one processor, performs a method for determining availability of one or more drivers at one or more pit stops for driving one or more vehicles, the one or more vehicles having one or more sensors, the method comprising:

receiving, at a computing device, a first set of data associated with a plurality of drivers, wherein the first set of data being received in real time;

collecting, at the computing device, a second set of data associated with vehicle of the one or more vehicles travelling from one point to another point, wherein the second set of data being collected from the one or more sensors installed in the one or more vehicles wherein each of the one or more vehicles being associated with a driver of the plurality of drivers; and wherein the second set of data being collected in real time;

gathering, at the computing device, a third set of data associated with a trip plan of one or more trip plans associated with each vehicle of the one or more vehicles, wherein the one or more trip plans corresponds to travel route from a source location to a destination location and wherein the third set of data being gathered in real time;

analyzing, at the computing device, the first set of data, the second set of data and the third set of data, wherein the analyzing being done in real time;

creating, at the driver relay system with the processor, a profile for each driver of the plurality of drivers based on the first set of data, rank of the driver, position of the driver, wherein the profile of each driver of the plurality of drivers being created to choose a suitable driver for the one or more vehicles in each trip plan of the one or more trip plans;

determining, at the computing device, one or more pit stops in the travel route associated with each of the one or more vehicles, wherein the one or more pit stops being determined based on the analysis of the first set of data, the second set of data and the third set of data;

searching, at the computing device, the availability of at least one driver of the plurality of drivers at the determined one or more pit stops to allocate the vehicle of the one or more vehicles driven by a first driver driving for a first distance of the travel route to a second driver for driving the vehicle for a second distance, wherein the searching being done in real time;

allocating, at the computing device, the available driver of the plurality of drivers to drive the vehicle of the one or more vehicles for trip distance between a first pit stop to a second pit stop, wherein the allocating being done based on the analysis of the first set of data, second set of data and the third set of data; and determining, at the driver relay system with the processor, entropy for the one or more vehicles travelling in multiple routes, wherein the entropy corresponds to the occurrence of the disruptions in the trip plan of the one or more trip plans and wherein the entropy being calculated in real time.

* * * * *